S. KETCHUM.
Smut Machine.
No. 10,697.
Patented March 28, 1854.
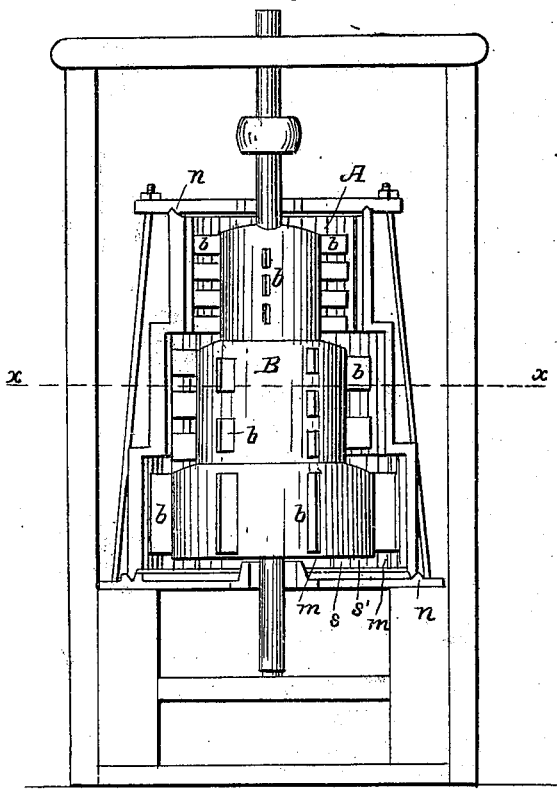
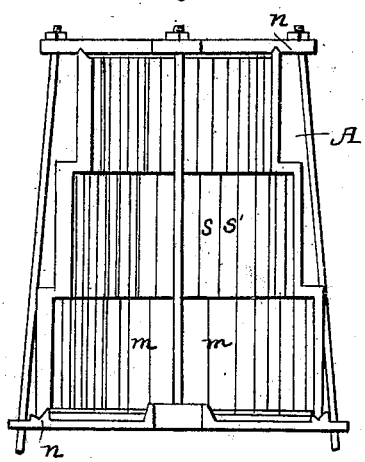
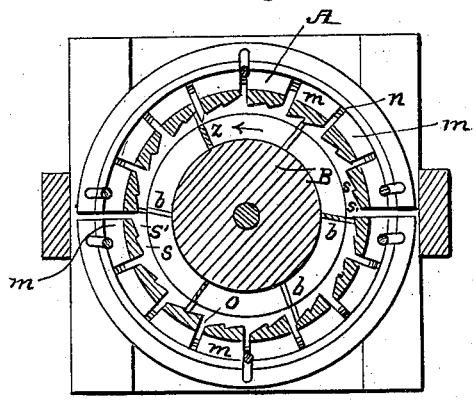

UNITED STATES PATENT OFFICE.

SEYMOUR KETCHUM, OF LANCASTER, OHIO.

SMUT-MACHINE.

Specification of Letters Patent No. 10,697, dated March 28, 1854.

*To all whom it may concern:*

Be it known that I, SEYMOUR KETCHUM, of Lancaster, in the county of Fairfield and State of Ohio, have invented a certain new and useful Improvement in Smut Machines, of which the following is a full, clear, and exact description, reference being had to the accompanying drawing, which forms part of this specification, and in which—

Figure 1 represents an elevation of my improved machine with one-half of the concave removed; Fig. 2, an interior view of one-half of the concave, detached; and Fig. 3 a horizontal section through the line $x\ x$ in Fig. 1.

My improvement has reference to that class of smut or wheat cleaning machines which are arranged to work vertically.

In the machine represented in the accompanying drawing, the wheat to be cleaned is fed by hopper or otherwise through an aperture at the top into a concave or cylinder (A), and, after being acted upon by beaters projecting from a runner (B), is delivered, thoroughly cleansed, through an opening or openings in the bottom of the concave. The runner (B) has rotary motion given to it in the direction indicated by the arrow ($z$) in Fig. 3. This runner is composed of drums of different diameters arranged around and secured to a vertical shaft, the smallest drum being uppermost and each under one in succession of larger diameter than the one immediately above it. Beaters or wings ($b$) project from the peripheries of the drums. These beaters are arranged in vertical rows around the drums and are set slightly inclining backward outwardly from a radial position, so that, when the runner revolves, they beat or throw out the grain against the sides or interior faces of the concave. Each row of beaters on the upper drum may consist, alternately, of three and four beaters, so that the spaces in either one row will be covered, as it were, by the beaters of the next adjoining row, whereby any wheat passing through the spaces in the beaters of the one row will be met and acted upon by the beaters of the next row, while the grain by passing in between the beaters will be operated on and scraped by the horizontal edges of the beaters. The beaters around the second drum may be similarly arranged, but there should be a less number of beaters in each row and an increased number of rows so as to break the vertical continuity of the beaters on the upper drum for the purpose of acting with certainty upon any wheat which, falling down in between the upper rows of beaters, may have escaped the action of those beaters, and, by the diminished number of beaters in each row around the second drum, a proper amount of scraping surface of the horizontal edges of the beaters will be given to suit the increased velocity of those beaters, by reason of the larger diameter of that drum, so as effectually to scrape but not cut or injure the grain; while the still greater velocity of the third or lower drum makes it advisable—to prevent the grain being cut or bruised—that the beaters on it should not be divided but consist of one flat beater in each row.

The stationary case or concave (A) is of corresponding configuration to the runner, it having the appearance of a series of cylinders one above the other, so as to leave a like or proper amount of space between each of the several drums of the runner and its concave. This concave is formed of metal staves ($m$) extending the whole depth of the concave and fitting at their top and bottom ends in a circular groove ($n$) made in the bottom and in the top horizontal head of the concave, and the staves are of such breadths as to leave an equal open space in between each for the smut, dust and other extraneous matter to pass out, or, being fitted as described in circular grooves made in the heads, the distances between the staves may be of irregular widths, or the staves be made to meet in pairs so as to leave a wide or largely open space between either two, by merely sliding the staves nearer to or farther from one another in the grooves of the heads according to the clean or dirty, &c., condition of the wheat under operation, the openings for the escape of the extraneous matter sometimes requiring to be large and sometimes small according to circumstances; also, by having one-half of the concave removable, staves of greater or less width may be readily substituted and fitted in the heads according to the altered width and number of escape openings required.

The staves are made to present a step formation on their interior by beveling them on their inner face so that they are thinner on their one edge longitudinally than the other, or two steps ($s$ and $s'$) may be formed on each stave so as to present an increased number of projecting scouring edges for the wheat as it is thrown against them in circuitous courses by the beaters, and the steps, thus formed, likewise serve, by the angular run of them outward in an opposite direction to the travel of the runner (the thickest edge of the stave being foremost), to project the wheat back into between the beaters and prevent it escaping through the openings between the staves for passing off the smut, dust and other extraneous matter which being powdered or light will be blown out by the blast created by the drums and their beaters, and the escape openings between the staves may, by this angular step formation of the concave, be as wide or even wider than a grain of wheat, without letting any therethrough, while a free escape is insured for all the dust and dirt to pass off; the wheat too by this arrangement will be acted upon several times by the beaters, by each step in succession projecting the kernels back again, and, by the frequent striking of the wheat against the steps, it becomes most thoroughly scoured. Thus these steps in the concave act much more perfectly in scouring the wheat than do the strips of the ordinary ribbed concave of other smut machines, and there is no possibility of the wheat escaping the repeated action of the beaters as is the case in ribbed concaves generally by the lodging of the wheat in the angles of the ribs and, passing as along a channel, down the ribs, and through the machine, only partially cleansed.

The wheat in passing through my improved machine is first acted upon by the beaters of the upper drum against the stepped concave as described and afterward by the beaters of the other two drums in succession, and, by this means, is exposed, in a scattered stream or body, to several, as it were, long or broad runners moving at different velocities, which action is superior to that of the ordinary conical runner though the object is the same, namely, to perfect the process of cleaning by quickening the action as the grain passes through the machine, but the effect is improved, inasmuch as the varying velocities are abrupt, whereby clogging is avoided, a better agitation insured and that tendency, which pertains to the conical runner, of the grain gradually to work its way down the runner, without being thrown against the concave, is avoided, for the fall of the wheat being broken in its passing over and to each under or larger drum, combined with the abrupt increase in velocity of the beating surface, insures every kernel, whatever its specific gravity, being thrown against the concave and thoroughly scoured, which would not be the case where the fall of the grain, alone, broken by intervening disks as machines so constructed have proved, such machines also requiring a large amount of power to drive them by reason of the lodging of the grain on the disks and such machines involve the necessity of a separate fan blast (which is avoided by the use of the drums) to blow out the smut and dirt, but the abrupt varying sizes of the drum formation of the runner herein described, combined with the similarly shaped and stepped configuration of the interior of the concave causing the grain to be projected back and exposing it to a continuity of repeated beats, together with the free escape which the angular formation of the steps ($s$ and $s'$) allows for the smut and dust to pass off through the staves without letting the wheat therethrough—though the openings be made wider than the kernals are long—coupled too with the centrifugal blast which is created by the drums, enables me, as I have proved in practice, to run the machine much slower than is usual with any other smut machine, thereby preventing "firing," and requiring a less amount of power to drive it, the wheat being delivered at the bottom thoroughly cleansed while the smut, dust and other extraneous matter is perfectly passed off from the machine through the specified wide, and adjustable, openings between the staves,—the said openings, by their width, being not liable to clog as is frequently the case in narrow escape apertures when the smut is damp.

I do not claim, of itself, building the concave of staves with vertical openings between or in them for the dust, &c., to pass through; but I do claim as new and useful, and desire to secure by Letters Patent, The concave constructed as described, that is to say, of loose staves so fitted to or connected with the heads of the concave as to be capable of circular adjustment with facility and despatch, substantially as specified, for the purpose of varying the number and widths of the escape openings between the staves, the said staves being formed on their inner face with a longitudinal step or steps inclining outward backwardly in relation to the travel of the runner, whereby the width of the openings between the staves may be made large so as to form a ready escape for the smut, dust and other extraneous matter, without letting out the grain or wheat therethrough, and whereby the clogging of the escape openings by damp smut is avoided, essentially as herein set forth.

In testimony whereof, I have hereunto subscribed my name.

S. KETCHUM.

Witnesses:
 SAM GRUBB,
 A. GREGORY.